United States Patent
Wang et al.

(10) Patent No.: US 6,524,018 B2
(45) Date of Patent: Feb. 25, 2003

(54) OPTICAL ASSEMBLY

(75) Inventors: Chung Yung Wang, Tu-Chen (TW); Hung Lun Chang, Tu-Chen (TW); Hsiang-Jui Wang, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 16 days.

(21) Appl. No.: 09/797,638

(22) Filed: Mar. 1, 2001

(65) Prior Publication Data

US 2002/0122638 A1 Sep. 5, 2002

(51) Int. Cl.$^7$ ................................................. G02B 6/36
(52) U.S. Cl. ........................ 385/92; 285/21.1; 219/538; 156/60
(58) Field of Search ............................. 385/92, 88, 93, 385/94; 285/21.1; 219/538, 544; 156/60

(56) References Cited

U.S. PATENT DOCUMENTS

| | | | | | |
|---|---|---|---|---|---|
| 4,684,417 A | * | 8/1987 | Grandclement | ............. | 138/104 |
| 5,150,922 A | * | 9/1992 | Nakashiba et al. | ......... | 219/535 |
| 5,255,942 A | * | 10/1993 | Kenworthy | ................... | 138/89 |
| 6,137,926 A | * | 10/2000 | Maynard | ..................... | 385/18 |
| 6,392,208 B1 | * | 5/2002 | Arx | ............................. | 219/544 |

* cited by examiner

Primary Examiner—Ellen E. Kim
(74) Attorney, Agent, or Firm—Wei Te Chung

(57) ABSTRACT

An optical assembly includes a light source, a support member and a receptacle. The support member is made of plastic, forming a first junction surface. The light source is contained in the support member. The receptacle is made of metal or plastic forming a second junction surface. The receptacle is attached to the support member with the second junction surface positioned on the first junction surface. A resistance wire is positioned in the support member surrounding the aperture and proximate the first junction surface. Two terminals of the wire extend outside the support member for being coupled to an external power source. To assemble the optical assembly, the receptacle and the support member are mounted in an aligning apparatus which operates to adjust the relative position between the receptacle and the support member. After adjusting to have the members in perfect alignment, a heat cured epoxy is applied between the surfaces, power is then supplied to the resistance wire to heat and cure the epoxy and thus securing the receptacle to the support member.

13 Claims, 4 Drawing Sheets

OPTICAL ASSEMBLY

BACKGROUND OF THE INVENTION

1. Field of the Invention

The present invention relates to an optical assembly and more specifically to a transceiver assembly which is used for receiving or transmitting optical signals.

2. The Related Art

An optical transceiver module is an important part of an optical communication system. The optical transceiver requires an optical assembly for receiving or transmitting optical signals. The optical assembly consists of many parts which must have precise relative orientation with respect to each other. This complicates the assembling process of the optical assembly. Thus a variety of methods have been developed for manufacturing the optical assembly.

Heat cured epoxy is one of the methods for assembling the optical assembly. The optical assembly includes a support member and a cap member, wherein the support member has a first surface, and the cap member has a corresponding and matching second surface. To assemble, the cap member and the support member are held by an aligning apparatus which is adjusted to have the members in perfect alignment. The members are brought together with the first surface and the second surface mating each other. Heat cured epoxy is applied between the surfaces. Heat is then applied to cure the epoxy by placing the aligning apparatus and the members in a heating oven.

Since it is difficult to have a uniform heating result on the members, the members may displace with respect to each other during the heating process, deteriorating the alignment between the members. Furthermore, unexpected contacts or impacts may occur on the aligning apparatus when it is moved into the heating oven. Such contact or impact may cause misalignment between the members.

Besides the above drawbacks, this method is not suitable for single-mode fiber transmission system. A single-mode optic fiber has a core with a diameter of only 6–10 $\mu$m. An offset of 0.5 $\mu$m between the members will significantly affect the system.

U.S. Pat. No. 4,969,702 (See FIG. 1) teaches a different method. As shown in FIG. 1, a laser diode 12 is positioned in a support member 14. A focusing member 16, such as a gradient index lens having a planar surface and an opposing convex surface, is positioned with respect to he laser diode 12 such that an output beam from the laser diode 12 passes through the lens 16. A cap member 18 which defines an aperture 22 for receiving a ferrule 26 in which a fiber optic cable 24 is retained is attached to the support member 4 with a mounting surface 20 of the cap member 18 in contact with the support member 14. The relative position between the cap member 18 and the support member 14 is adjusted by aligning apparatus to have the aperture 22 of cap member 18 in alignment with the lens 16. A UV (ultraviolet) cured epoxy is applied between the cap member and the support member so that when the assembly is exposed to UV light, the epoxy is cured and thus fixes the cap member to the support member.

To allow the epoxy to be exposed to the UV, at least one of the members must be transparent. This limits the selection of the material. Furthermore, to avoid blocking UV light, a special design of the aligning apparatus is required. This increases the cost of design and manufacture.

Another method of assembling the optical assembly is disclosed in U.S. Pat. No. 5,073,047 (See FIG. 2). The optical assembly shown in FIG. 2 includes a light source 15 retained in a holder 19, a housing 17 and a receptacle 1. The holder 19 is fusion-welded to the housing 17 by a laser beam. A positional adjustment is performed to align the housing 17 with respect to the receptacle 1. The aligned housing 17 and receptacle 1 are also solidly welded together by means of a laser beam. The cost for performing laser welding is high.

Instant glue is also often employed to attach parts of an optic assembly together due to its low cost. After a positional adjustment is performed between a support member and a cap member by means of an aligning apparatus, the instant glue is applied on the interface between the cap member and the support member. The members are fixed together when the instant glue is cured. The method suffers a non-uniform curing result of the glue because the glue is cured by being contacted with steam and it is hard to control the distribution of steam in a given space. This may cause displacements of the members with respect to each other, resulting in misalignment.

In view of the above, an optical assembly which is assembled easily and has a precise relative orientation is required.

SUMMARY OF THE INVENTION

In view of above described problems of the prior art, it is an object of the present invention to provide an optical assembly which can be assembled easily and effectively.

Another object of the present invention is to provide an optical assembly having a precise relative orientation.

To achieve the above objects, the present invention provides a method of assembling an optical assembly using a heat cured epoxy. The optical assembly includes a support member and a receptacle. The support member has a first junction surface and the receptacle has a second junction surface. An electrical heating wire is positioned in the support member proximate the first surface. After having the members in perfect alignment, a heat cured epoxy is applied between the first and second junction surface. The epoxy is cured by heat generated by the heating wire thereby securing the receptacle to the support member.

DESCRIPTION OF THE PREFERRED EMBODIMENT

Figure 1:
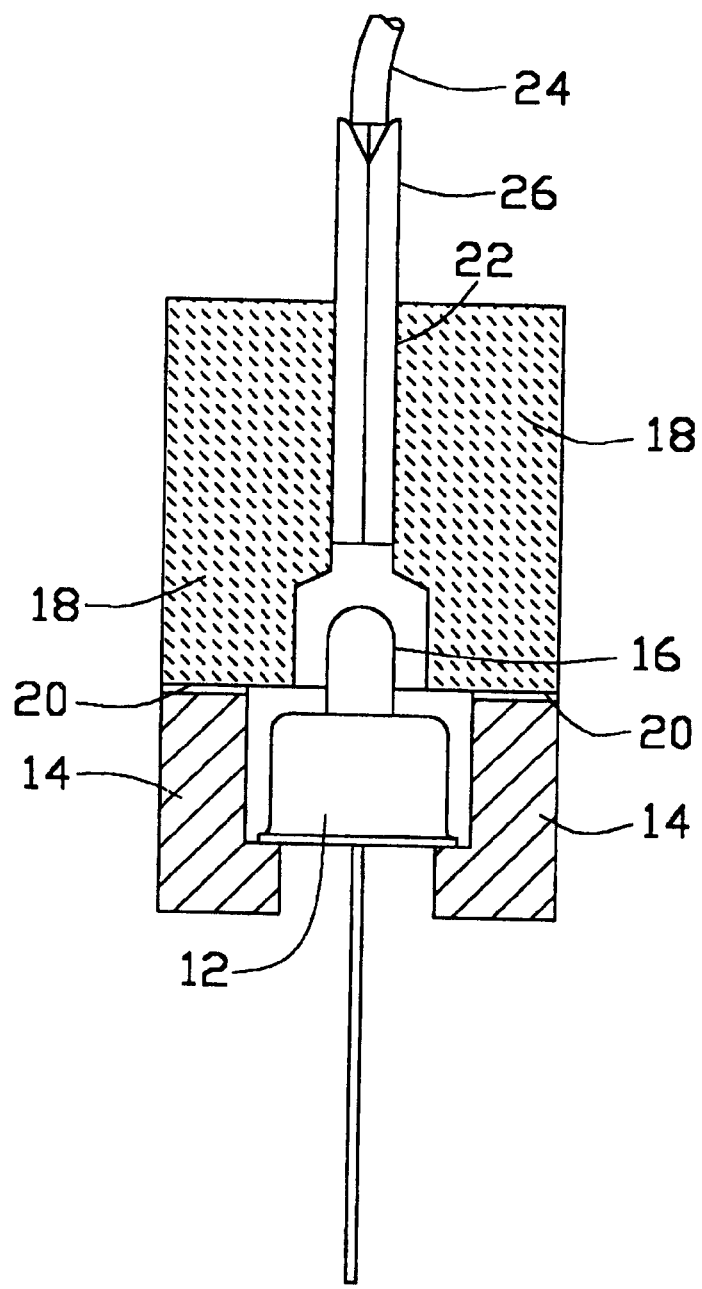
FIG. 1 is a cross-sectional view of a conventional optical assembly.
Figure 2:
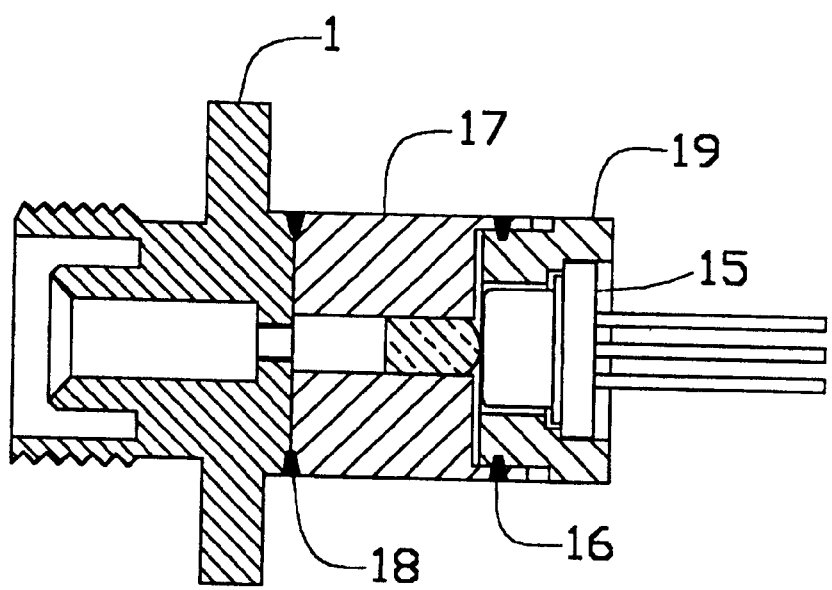
FIG. 2 is a cross-sectional view of another conventional optical assembly.
Figure 3:
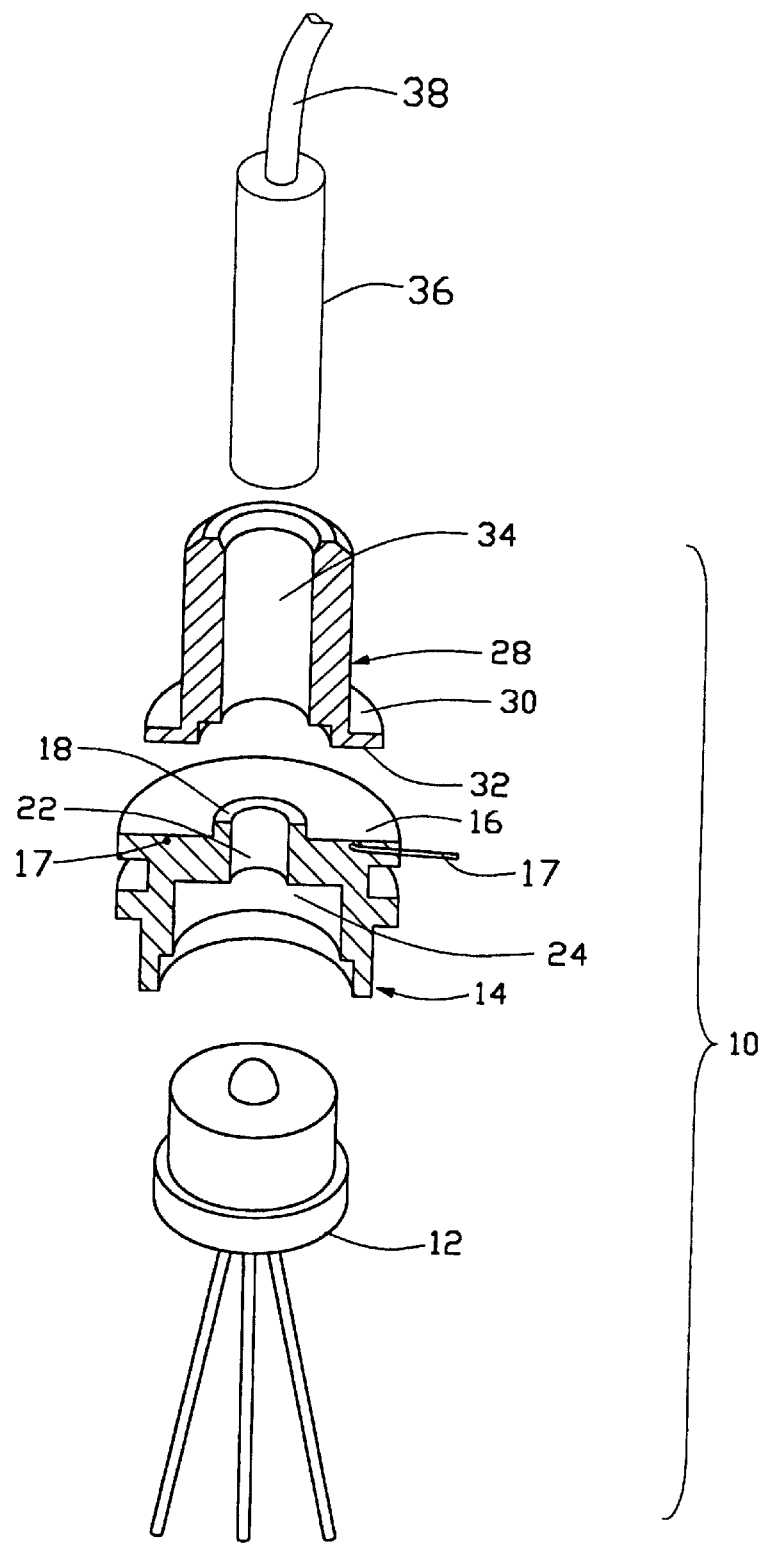
FIG. 3 is an exploded view of an optical assembly in accordance with the present invention.
Figure 4:
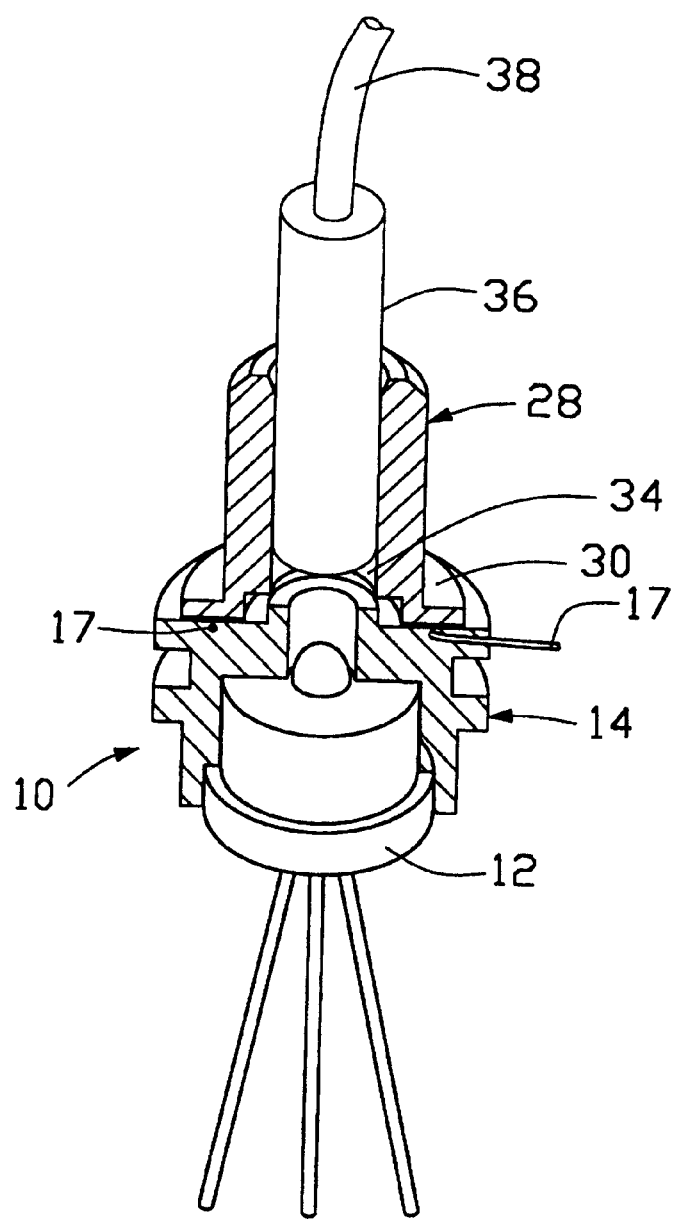
FIG. 4 is an assembled view, partially broken, of the optical assembly in accordance with the present invention.

Referring to FIGS. 3 and 4, there is shown an optical assembly according to the present invention. The optical assembly comprises a light source 12, a support member 14, a receptacle 28 and a ferrule 36 retaining an optical fiber 38. The light source 12, such as a laser diode (LD) or a light emitting diode (LED), is fixedly received and contained in a cavity 24 defined in the support member 14.

The support member 14 is made of plastic, having a first junction surface 16. The support member 14 forms a cylindrical projection 18 on the first junction surface 16 in which an aperture 22 is defined. The aperture 22 is in communication with the cavity 14 and is preferably perpendicular to the first junction surface 16.

The receptacle 28 has a circumferential flange 30 forming a second junction surface 32. The receptacle 28 is attached to the support member 14 with the second junction surface 32 positioned on the first junction surface 16 of the support member 14. A bore 34 proximate the second surface 16 is defined in the receptacle 28 and extends in a direction perpendicular to the second junction surface 32 for receiving the ferrule 36. The bore 34 has an expanded section for receiving the cylindrical projection 18 of the support member 14.

An electrical heating wire 17 is embedded in the support member 14 by means of injection molding. The wire 17 surrounds the aperture 22 proximate the first junction surface 16. Two terminals of the wire 17 extend outside the support member 14 for electrically connecting to a power supply circuit.

To assembly the optical assembly, the ferrule 36 with an optical fiber 38 retained therein is inserted in the bore 34 defined in the receptacle 28. An optical power metering device (not shown) is coupled to a free end of the optical fiber 38 for measuring the power of an optical output. The receptacle 28 containing the ferrule 36 with the optical fiber 38 and the support member 14 containing the light source 12 are mounted in a aligning apparatus which operates to adjust the relative position between the receptacle 28 and the support member 14 to as to obtain a maximum output reading the metering device. After adjusting the support member and the receptacle to have the light source and the optical fiber in perfect alignment, a heat cured epoxy is applied between the first and second junction surfaces, power is then supplied to the resistance wire to heat and cure the heat cured epoxy and thus securing the receptacle 28 to the support member 14 with the light source 12 and the optical fiber 38 in perfect alignment. Dismount the optical assembly 10 from the aligning apparatus after the epoxy is cured and remove the portions of the resistance wire 17 which extend outside the support member 14.

It is apparent to those having ordinary skill that instead of being embedded in the support member 14, the resistance wire 17 may be embedded in or mounted to the receptacle 28 proximate the second junction surface 32 for curing the epoxy. Understandably, instead of installing the resistance wire 17 into only one of the support member 14 and the receptacle 28, an installation the resistance wire 17 into both two is another alternatives.

Although the present invention has been described through specific terms, it should be noted here that the described embodiment is not necessarily exclusive and that various changes and modifications may be imparted thereto without departing from the scope of the invention which is limited solely by the appended claims.

What is claimed is:

1. An optical assembly, comprising:
   a light source; an optical fiber ferrule; a support member for receiving said light source, having a first junction surface and an aperture defined though the receptacle and the first junction surface, an electrical singly wound heating wire member being positioned in the support member proximate the first plane of the first junction surface and surrounding the aperture;
   a receptacle for holding said optical fiber ferrule, having a second junction surface positioned on the first junction surface; and
   heat-activating securing means between the first and second junction surfaces for securing the receptacle to the support member first plane of the first junction surface is perpendicular to the longitudinal axis of the aperture.

2. The optical assembly according to claim 1, wherein said heating member is embedded in said support member by injection molding.

3. The optical assembly according to claim 2, wherein two terminals of said heating member extend outside the support member and are adapted to be coupled to an external power source.

4. The optical assembly according to claim 1, wherein the support member forms a cylindrical projection on the first junction surface.

5. The optical assembly according to claim 4, wherein the receptacle defines a bore.

6. The optical assembly according to claim 5, wherein the bore forms an expanded section fitting over the projection of the support member.

7. The optical assembly according to claim 1, wherein the support member defines a cavity in communication with the aperture.

8. The optical assembly according to claim 1, wherein the heat-activating securing means comprises a heat cured epoxy for securing the support member to the receptacle.

9. An optical assembly, comprising:
   a light source;
   an optical fiber ferrule;
   a support member for receiving said light source, having a first junction surface;
   a receptacle for holding said fiber ferrule, having a second junction surface positioned on the first junction surface and a bore defined though the receptacle and the second junction surface, an electrical singly wound heating wire member being positioned in the receptacle proximate the first plane of the second junction surface and surrounding the bore; and
   heat-activating securing means between the first and second junction surfaces for securing the receptacle to the support member said first plane of the first junction surface is perpendicular to the longitudinal axis of the bore.

10. An optical assembly, comprising:
    a light source;
    an optical fiber ferrule;
    a support member for receiving said light source, having a first junction surface and an aperture defined though the support member and the first junction surface, an electrical singly wound heating wire member being positioned in the support member proximate the first plane of the first junction surface and surrounding the aperture;
    a receptacle for holding said optical fiber ferrule, having a second junction surface positioned on the first junction surface and a bore defined though the receptacle and the second junction surface, a heating member being positioned in the receptacle proximate the second junction surface and surrounding the bore; and
    heat-activating securing means between the first and second junction surfaces for securing the receptacle to the support member said first plane of the first junction surface is perpendicular to the longitudinal axis of the aperture.

11. A method of assembling an optical assembly comprising steps of:

providing a support with a first junction surface thereon;

providing a receptacle with thereon a second junction surface opposite to said first junction surface;

applying heat-activating securing means between the first and second junction surfaces;

providing one of said support member and said receptacle with a heating member close to the corresponding junction surface; and activating said heat member to cure said heat activating securing means; wherein said heating member is provided with a connection end exposed outside said one of said support member and said receptacle for connecting to a power supply, while later said connection end is removed after the heat-activating securing means is cured.

12. The method according to claim 11, wherein before the heat member is activated, an optical fiber and an associated ferrule is inserted into a bore of the receptacle with one end thereof coupled to an optical power metering device, and a light source is installed into the support member for adjusting the relative positions between the support member and the receptacle.

13. The optical assembly according to claim 4, wherein the aperture extends through the projection.

* * * * *